United States Patent
Orr et al.

[11] Patent Number: 5,971,169
[45] Date of Patent: Oct. 26, 1999

[54] PANEL-SUPPORTED DISPLAY UNIT

[75] Inventors: Henry C. Orr; Eric Ludewig, both of Syracuse; Donald Crispin, North Syracuse; Robert K. Scherzer; James Dokoupil, both of Liverpool, all of N.Y.

[73] Assignee: The Croydon Company, Inc., Liverpool, N.Y.

[21] Appl. No.: 09/064,901

[22] Filed: Apr. 23, 1998

[51] Int. Cl.[6] .............................. A47G 29/00; A47H 1/00; A47F 5/02

[52] U.S. Cl. ................................. 211/95; 211/40; 211/163

[58] Field of Search ..................................... 211/40, 41.12, 211/42, 88.01, 106, 115, 119.004, 144, 163, 87.01, 95

[56] References Cited

U.S. PATENT DOCUMENTS

| | | | |
|---|---|---|---|
| 3,844,230 | 10/1974 | Hudson et al. | 211/163 |
| 3,960,273 | 6/1976 | Weston | 211/40 |
| 3,982,633 | 9/1976 | Pennington | 211/40 |
| 4,228,906 | 10/1980 | Jones | 211/88.01 |
| 4,531,645 | 7/1985 | Tisbo et al. | 211/163 |
| 4,776,623 | 10/1988 | Manning | 211/40 |
| 5,259,515 | 11/1993 | Koeppel | 211/40 |
| 5,397,005 | 3/1995 | Taccolini | 211/163 |
| 5,462,178 | 10/1995 | Wallach et al. | 211/163 |
| 5,582,301 | 12/1996 | Josephson | 211/163 |

*Primary Examiner*—Daniel P. Stodola
*Assistant Examiner*—Jennifer E. Novosad
*Attorney, Agent, or Firm*—George R. McGuire

[57] ABSTRACT

A display unit for media such as books, audio and video cassettes, etc. includes a rotating tower-type array of shelves and a supporting framework which is mountable to a rigid, vertically oriented panel, such as the end panel of a bookcase. The rotatable tower is mounted between the free ends of a pair of horizontal support arms which are fixedly supported at their other ends by a vertical column and a cross-arm which extends across and is fixedly attached at its mid-point to the upper end of the vertical column. A pair of U-shaped members are mounted to opposite ends of the cross-arm and are rotatable with respect thereto about the horizontal, longitudinal axis of the cross-arm. The unit is mounted to the panel by the U-shaped members passing around the side edges of the panel so that one of the legs of each member contacts the rear side of the panel while the remainder of the unit rests against the front side.

15 Claims, 4 Drawing Sheets

PANEL-SUPPORTED DISPLAY UNIT

BACKGROUND OF THE INVENTION

The present invention relates to apparatus for storing and displaying items such as books, audio or video cassettes, compact disc holders, and the like. More specifically, the invention relates to open-sided display racks which may be releasably mounted upon and supported by a vertically oriented, rigid panel, such as the end panel of a bookshelf.

An object of the invention is to provide a compact unit capable of supporting a large number of books, or other such items, relative to the physical size and volume of the unit with means for mounting and supporting the item in a space-saving manner.

A further object of the invention is to provide a display unit mounted for rotation about a vertical axis which may conveniently be supported above floor level by a vertically oriented, flat, rigid panel without the aid of tools or separate fasteners.

Other objects will in part be obvious and will in part appear hereinafter.

SUMMARY OF THE INVENTION

The display unit of the invention includes a display unit of the well-known "tower" type comprising a plurality of shelves supported in vertically spaced relation by a system of rigid, vertical rods attached to the shelves at their peripheral edges. The interconnected rods and shelves are supported for rotation about a central, vertical axis for ease of viewing the books, or other such items which are placed on the unit with titles or other identifying indicia visible from the four sides of the unit. The shelf/rod assembly is positioned between the free ends of a pair of A further horizontal arm, termed a cross-arm, is fixedly attached at its mid-point to one or both of the upper ends of the vertical column and/or the fixed end of the upper, horizontal support arm. The cross-arm is mutually perpendicular to the vertical column and the upper support arm.

A pair of U-shaped members are respectively connected to opposite ends of the cross-arm with one leg of each member extending along and rotatable about the longitudinal axis of the cross-arm. The entire unit is intended for support by a rigid, vertically oriented panel, such as an end panel of a conventional bookshelf having a width less than the distance between the medial portions of the U-shaped members, and greater than the distance between the free ends of the unconnected legs thereof. The U-shaped members extend around opposite, vertical edges of the panel which is contacted on its outer surface by rear surfaces of the vertical column anc cross-arm. The weight of the support arms and shelf/rod assembly, as well as any items placed on the shelves, create a turning moment, essentially about the axis of the cross-arm, tending to frictionally engage the rear surfaces of the vertical column and cross-arm with the outer surface of the rigid panel, thereby supporting the display unit above floor level.

The foregoing and other features of construction and use of the unit will be more readily apparent and fully appreciated from the following detailed disclosure, taken in conjunction with the accompanying drawings.

DETAILED DESCRIPTION

Figure 1:
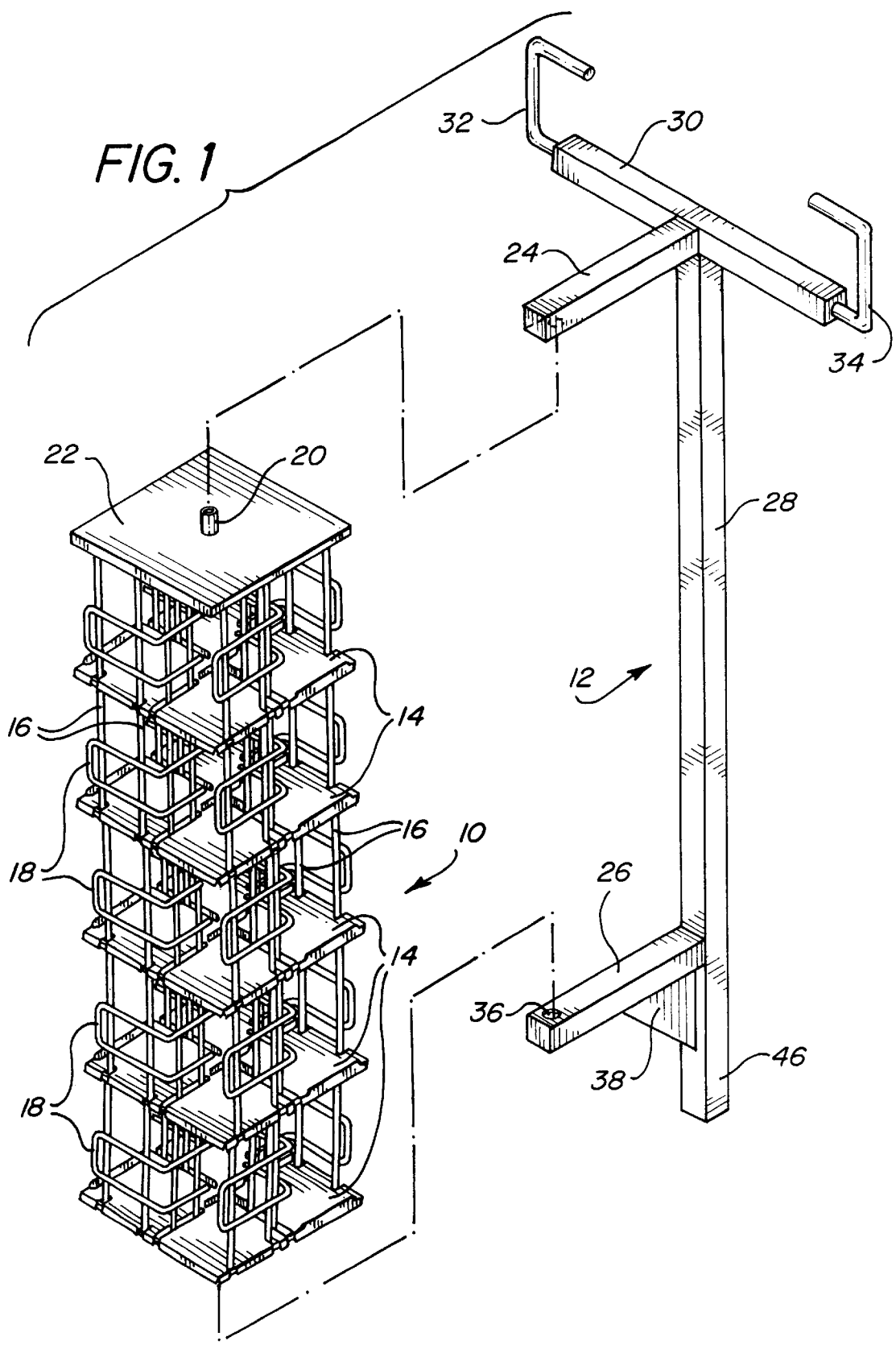
FIG. 1 is a perspective view of the apparatus of the invention with the two major subassemblies thereof in spaced relation.

The display unit of the invention includes two subassemblies, shown in FIG. 1 in exploded perspective and denoted generally by reference numerals 10 and 12. Subassembly 10 includes a plurality of essentially square shelves 14, supported in vertically spaced relation by a series of vertically extending rods 16, each rod extending through slots in the shelves. Partitioning members 18, which may be fabricated from the same stock as rods 16, are affixed to the rods, e.g. by welding or soldering, to provide four compartments on each shelf. Each compartment is open at the front, to permit items to be placed in and removed from the compartments over approximately half the width of each side of the shelves. Pin 20 extends upwardly from a square top member 22, and a similar pin (not shown) extends downwardly from the bottom of the lowermost of shelves 14.

Subassembly 10 is intended primarily to hold and display items such as books, video and audio cassettes, CDs, and the like, which are displayed for sale or rental, as well as in library settings. The interrelationships of the shelves, rods and support members is not further elaborated upon as so-called tower units of this type are well-known and suited for incorporation in the display unit of the invention in any of a number of conventional configurations. In fact, rods 16 and partitioning members 18 may be replaced by plastic sheets or panels, preferably transparent. The only requirement is that a plurality of shelves, preferably square, must be supported in vertically spaced relation by appropriate supporting elements and that the unit be adapted for rotation about a vertical axis when in use. It will be further understood that terms such as vertical, horizontal, upper, lower and the like, are intended to apply to the display unit in its normal orientation when in use and not in an otherwise limiting sense.

Figure 2:
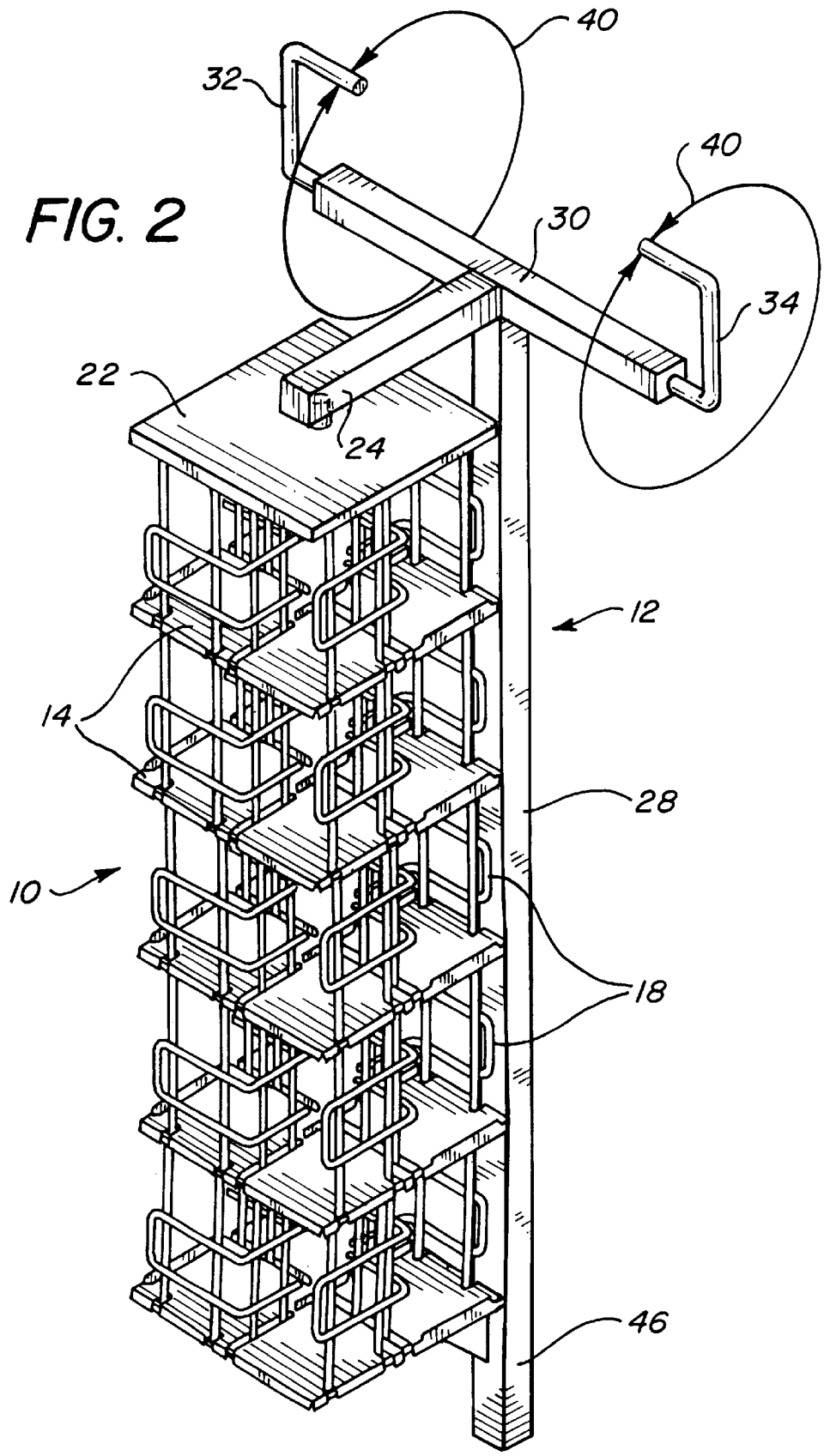
FIG. 2 is a perspective view of the apparatus in fully assembled condition.

Subassembly 12 includes upper and lower support arms 24 and 26, respectively, vertically extending columns 28, cross-arm 30 and U-shaped members 32 and 34. Support arms 24 and 26 extend from supported ends to free ends and are spaced to accept the pin extending downwardly from the lower shelf into opening 36 of the lower arm 26, and pin 20 in a like opening (not shown) in the lower side of upper arm 24. When assembled, as shown in FIG. 2, subassembly 10 is supported by subassembly 12 for rotation of the former about the central, vertical axis thereof. Since virtually all of the weight is carried by support arm 26, reinforcing bracket 38 is preferably provided, as best seen in FIG. 1.

All parts of the unit may be, and preferably are, constructed of steel, although the invention encompasses the use of any suitable material(s). Cross-arm 30 is affixed (welded) at its midpoint to the upper end of column 28, and the fixed ends of support arms 24 and 26 are affixed to column 28 and cross-arm 30, respectively. The horizontal distance from column 28 to the axis of rotation of subassembly 10 is sufficient to permit 360° rotation thereof without contacting the column. U-shaped members 32 and 34 are connected to cross-arm 30 for rotation about the longitudinal axis thereof, as indicated by arrows 40 in FIG. 2.

Figure 3:
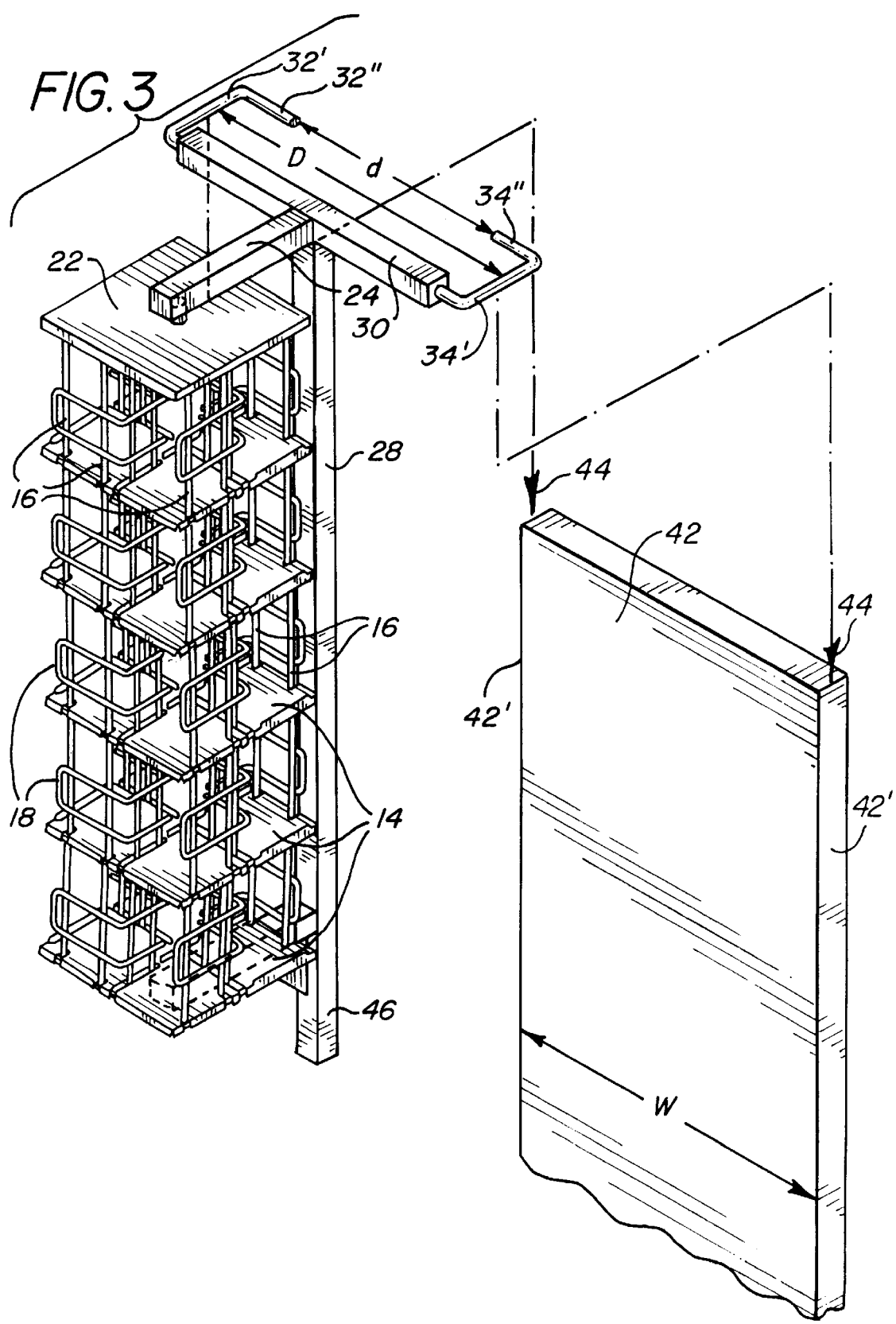
FIG. 3 is a perspective view of the assembled apparatus in spaced relation to a panel by which it is to be supported.
Figure 4:
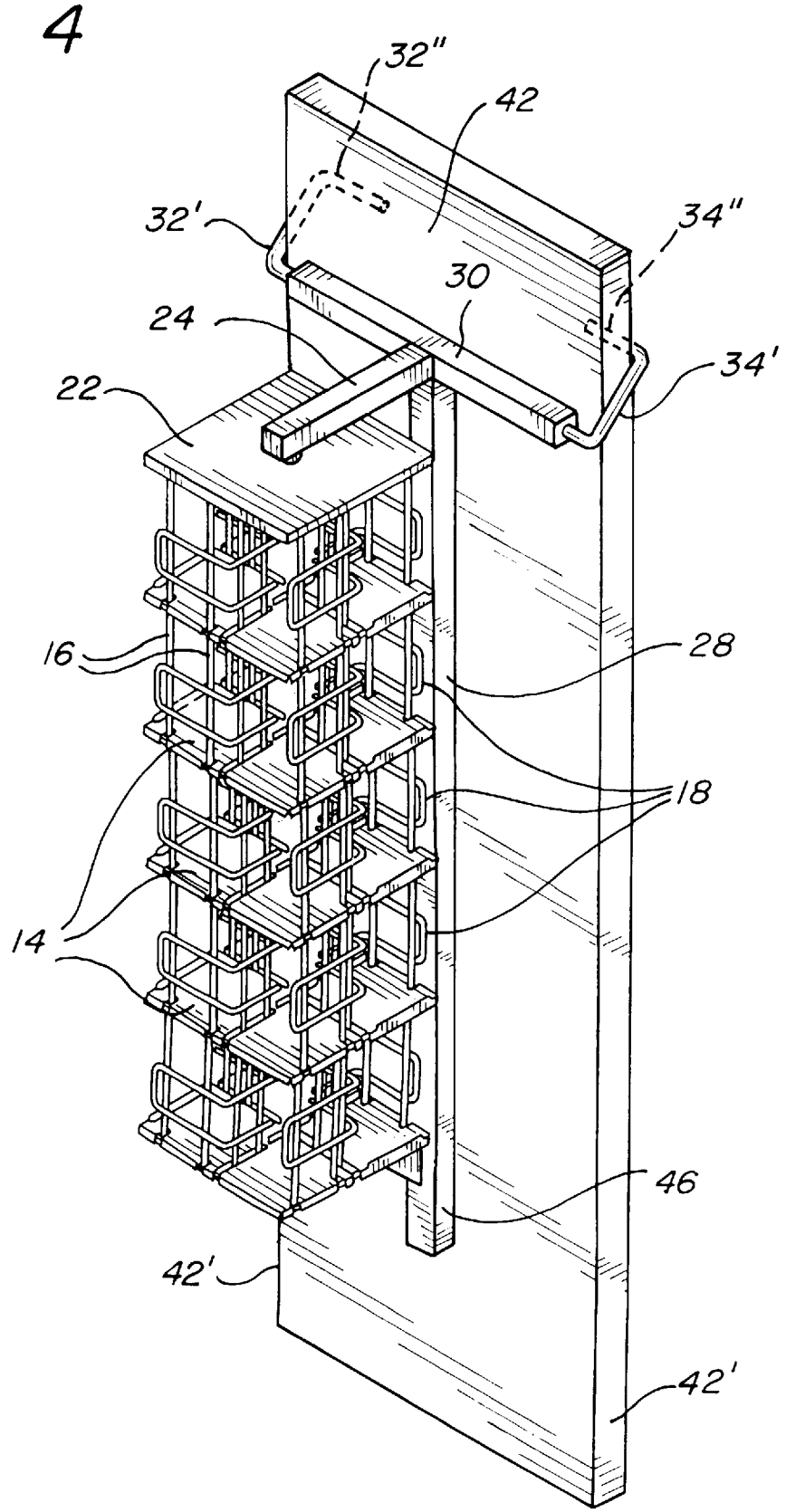
FIG. 4 is a perspective view of the unit in its intended, operative position, supported by the panel.

The fully assembled unit is intended for mounting upon a rigid panel such as that indicated in FIGS. 3 and 4 by reference numeral 42. Panel 42 may be the side or end panel of a bookshelf or other structure which is in place prior to the mounting of the display unit. Panel 42 has a width W which is less than distance D, between the medial portions of U-shaped members 32 and 34, and greater than distance d, between the free ends of members 32 and 34, all as indicated in FIG. 3. For example, W may be between about 20 and 25 inches. The display unit is positioned with vertical edges 42' of panel 42 between medial portions 32' and 34' of U-shaped members 32 and 34, respectively, with free legs 32" and 34" on what is termed the rear side of panel 42 and all of the remaining structure on the front side. If the structure of which panel 42 is a part includes a top panel or other structure which does not permit downward movement of members 32 and 34 from the upper side of the panel, as indicated by arrows 44 in FIG. 3, one or both of members 32 and 34 may be moved outwardly to increase distance d to be greater than width W. That is, one leg of each of members 32 and 34 extends slidingly into opposite ends of cross-arm 30 for a distance sufficient to permit outward and inward movement of the members along the longitudinal axis of the cross-arm. Alternatively, one leg of at least one of members 32 and 34 may be removable from and insertable into the opening(s) in cross-arm 30.

The display unit is shown in its intended position of use in FIG. 4. With legs 32" and 34" engaging the rear surface of panel 42, the rear surfaces of column 28 and cross-arm 30 will engage the front surface of the panel. With sufficient frictional resistance between opposing surfaces, the display unit will remain in the position shown, with lower end 46 of column 28 above floor level, although it is contemplated that end 46 may rest on the floor, if desired. The items to be displayed may then be placed upon shelves 14, thereby utilizing previously unused space in both an attractive and effective manner.

What is claimed is:

1. A display unit for holding and visually displaying items and for releasable mounting to a vertically oriented, rigid panel, having a pair of side edges spaced by a predetermined distance, said display unit comprising:
   a) a first subassembly including a plurality of shelves and means for supporting said shelves in vertically spaced relation to one another, said shelves being intersected by a vertical axis;
   b) a second subassembly including a pair of support arms, each extending between first and second ends, first means for fixedly supporting said support arms with one of said first ends above and the other below said plurality of shelves and intersected by said vertical axis, a pair of U-shaped members, each having a pair of substantially parallel legs connected by a medial portion arranged to extend around said pair of said rigid panel's side edges to position first and second portions of each of said members on forward and rear sides, respectively, of said rigid panel, and second means for connecting said first means with said members; and
   c) third means for connecting said first subassembly to said first ends of said support arms for rotation of said first subassembly about said vertical axis.

2. The display unit of claim 1 wherein said shelves are substantially square and equal in size, and said vertical axis intersects the center of each shelf.

3. The display unit of claim 2 wherein said support arms are fixedly supported at said second ends.

4. The display unit of claim 3 wherein said first and second portions of said members comprise said legs.

5. The display unit of claim 1 wherein said second subassembly includes a vertically extending column having upper and lower ends.

6. The display unit of claim 5 wherein said second subassembly further includes a cross-arm extending horizontally across and affixed to said upper end of said column.

7. The display unit of claim 6 wherein said cross-arm has opposite ends, a horizontal, longitudinal axis, and is affixed to said column upper end substantially at the mid-point between said opposite ends.

8. The display unit of claim 7 wherein said members are respectively connected to said opposite ends of said cross-arm.

9. The display unit of claim 8 wherein one of said pair of legs of each of said members extends into an opening in respective opposite ends of said cross-arm.

10. The display unit of claim 9 wherein said one of said pair of legs of each of members is rotatable about said horizontal axis.

11. The display unit of claim 10 wherein said one of said pair of legs of at least one of said members is connected to said cross-arm for sliding movement into and out of said opening in said cross-arm.

12. A display unit of the rotating tower type for holding and displaying media and for non-fixed mounting to a rigid panel having a pair of vertically oriented, side edges spaced by a predetermined distance, said display unit comprising:
   a) a plurality of substantially equally dimensioned, square shelves;
   b) a framework holding said shelves in vertically spaced, horizontal planes and permitting items to be placed on and removed from said shelves from at least portions of each of the four sides thereof, and each of said shelves centrally intersected by a vertical axis;
   c) a vertical column having upper and lower ends;
   d) a cross-arm extending horizontally along a horizontal, longitudinal axis between opposite ends and fixedly attached to said upper end of said vertical column substantially at the mid-point between said opposite ends;
   e) first and second support arms extending horizontally in spaced relation between a first and a second end;
   f) means supporting said shelves and framework between said first ends of said support arms for rotation of said shelves and framework about said vertical axis;
   g) a pair of substantially U-shaped members each having a pair of substantially parallel legs joined by a medial portion, one of said legs of each of said members being connected to said opposite ends of said cross-arm to extend along said horizontal axis, said members having at least one portion wherein said medial portions are horizontally spaced from one another by a distance at least as great as said predetermined distance and the other of said legs are horizontally spaced from one another by a distance less than said predetermined distance.

13. The display unit of claim 12 wherein said one leg of at least one of said members is slidable into and out of an opening in said end of said cross-arm.

14. The display unit of claim 12, wherein said first support arm is fixedly attached at said second end thereof to said vertical column at a position above said lower end thereof.

15. The display unit of claim 14 wherein said second support arm is fixedly attached at said second end thereof to said cross-arm substantially at said mid-point and adjacent said upper end of said vertical column.

* * * * *